UNITED STATES PATENT OFFICE 2,526,655

WAX-RESIN COMPOSITIONS

William J. Sparks, Anthony H. Gleason, and Per K. Frolich, Westfield, N. J., assignors, by mesne assignments, to Jasco, Incorporated, a corporation of Delaware No Drawing. Application March 2, 1946, Serial No. 651,606

4 Claims. (Cl. 260—28.5)

This invention relates to wax compositions and particularly compositions containing mineral waxes and additives which impart vastly improved properties to the resultant compositions.

Waxes and particularly mineral waxes such as ozokerite, paraffin wax, and montan wax of varying melting points are widely used in coatings upon paper, wood, cloth and the like. It is of considerable importance in many of these coated products that they show very low moisture-vapor penetration. For many purposes it has been found that coatings consisting of paraffin or other waxeous materials are not entirely satisfactory and accordingly various substances such as cellulose derivatives, vinyl resin such as polyvinylacetate, polyisobutylene and also "Buna" type synthetic rubbers prepared by copolymerizing butadiene or other diolefin, with styrene or acrylonitrile have been added in order to increase the tensile strength, reduce the brittleness, increase the adhesiveness of the composition and reduce the moisture-vapor penetration of the coating with varying degrees of success.

It is the principal object of this invention to prepare waxeous coating compositions having improved qualities of resistance to moisture-vapor penetration, good strength, flexibility and the like.

More specifically, it is the object of this invention to prepare waxeous compositions containing additives which are compatible with the wax and which materially improve the properties of the resultant composition.

These and other objects will appear more clearly from the detailed specification and claims which follow.

We have found that wax coating compositions and particularly compositions containing mineral waxes as a base are substantially improved if there is incorporated therein hard, resinous, thermoplastic polymers having a molecular weight above about 400,000 which are obtained by polymerizing in aqueous emulsion a mixture of 65 to 95% by weight of a vinyl aromatic compound such as polychlorinated, polybrominated or polyfluorinated styrenes or compounds corresponding to the formula

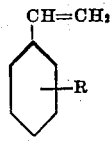

wherein R is selected from the group consisting of hydrogen, methyl, ethyl, propyl, methoxy, ethoxy, chlorine, bromine, fluorine and cyano and 35 to 5% by weight of a conjugated diolefin. While diolefins containing from 4 to 6 carbon atoms per molecule are preferred, other conjugated diolefins containing up to 12 carbon atoms per molecule can be used. Vinyl aromatic compounds which may be used in the copolymers in accordance with the present invention include styrene, para methyl-, ethyl- or propyl-styrenes, mono- and polychlorinated brominated or fluorinated styrenes, methoxy- or ethoxy styrenes or cyanostyrenes. Diolefins which may be used in such copolymers include butadiene, isoprene, piperylene, dimethyl butadiene, and the like. The preparation of these resins is described in detail in our copending application Serial No. 408,814, filed August 29, 1941 and now abandoned and in a continuation in part of said application bearing Serial No. 638,515 filed December 29, 1945. Essentially these copolymers are prepared by emulsifying one part of a monomer mixture of the foregoing composition in from one to two parts of water using a water-soluble soap, or the like as the emulsifier and then polymerizing the mixture in a suitable pressure vessel for about 10 to 75 hours at 25 to 75° C. When the reaction is completed or the monomers are at least above 80 to 90% converted to polymers, the resultant latex-like dispersion is coagulated, washed and dried, this washing and drying being preferably effected upon a hot mill (170-180° F.). The most desirable products for our purposes are obtained by a combination of high styrene to diene ratios, high conversion with consequent high molecular weight and hot mastication of the copolymer product.

While the copolymer as ordinarily prepared possesses a molecular weight, as determined from its intrinsic viscosity, above about 400,000, it is possible and under some circumstances it is advantageous to break down or partially depolymerize the copolymer in order to enhance its compatability with the waxeous materials with which it is to be compounded. This depolymerization may be readily effected on milling rollers, in a kneader or other suitable attritioning equipment.

The coating compositions in accordance with the present invention may be compounded with such waxeous materials as beeswax, spermaceti, coccerin, hydrogenated castor oil, or carnauba wax and preferably with mineral waxes such as paraffin, scalewax, ceresin or ozokerite, montan wax and the like.

Compounding of our coating compositions can be effected in various ways as by working the resinous material on a hot mill to a plastic condition, blending in small amounts of the desired waxeous material and then introducing that blend into the main body of waxeous material in a molten condition. Alternatively, the resinous material may be ground to a finely divided condition and then added directly to the molten waxeous material or either or both of the components may be dissolved in a suitable solvent and then mixed with the other whereupon the resultant composition may be used as such or the solvent evaporated and the composition applied as a hot melt.

The high molecular weight, resinous materials may be added to the waxeous materials in various amounts of from about 2 to about 60%. The most advantageous products are those containing from 5 to about 25% of resinous material and from about 95 to about 75% of waxeous material. Greater amounts of resin may be added, a point eventually being reached wherein the wax constitutes the additive and the resin becomes the material which is modified.

The coating compositions in accordance with the present invention are applicable to various types of sheet materials such as paper, cloth, wood, cellulose derivatives, cellophane or the like in order to render them more flexible or stronger or more resistant to moisture-vapor penetration and may also be advantageously applied to material such as stone, brick, mortar, concrete and the like in order to reduce moisture penetration.

The following examples are illustrative of the present invention, the percentages being given by weight:

*Example 1.*—A titanium dioxide loaded bond paper was coated with petroleum wax having a melting point of 132° F., the wax being applied at the rate of 8 pounds per ream which yielded a coating of 0.0021 inch thick.

This coated paper was then subjected to the moisture-vapor penetration test of the American Society of Testing Materials—D697–42T issued in 1942, method A or the desiccant method. In accordance with this method, a desiccant, calcium chloride, was placed inside a barrier made of the paper under test, the coating of the paper being on the outside, whereupon the barrier was exosed to air of controlled relative humidity and at a fixed temperature for 144 hours.

In this case the coated paper described above was exposed at 50% relative humidity and at 25° C. for 144 hours. The average value (five tests) for moisture-vapor penetration was 12.02 g. $H_2O$ per square meter per 24 hours.

When a blend of 5% of a resinous emulsion copolymer of styrene and isoprene, prepared as described below, in 95% of the same wax as above was coated on the same paper as above with the same weight of coating per ream and the same thickness of coating and the coated paper was subjected to the same moisture vapor penetration test, i. e., at 50% relative humidity and 25° C. for 144 hours, the average value (four tests) for moisture-vapor penetration was 4.8 g. $H_2O$ per square meter per 24 hours. The resinous emulsion copolymer used in this wax-resin blend was prepared as follows:

A mixture of 550 parts of styrene and 216 parts of a $C_5$ hydrocarbon fraction containing 80% isoprene was emulsified in 1250 parts of an aqueous solution of sodium oleate of 2.5% strength. One hundred and twenty-five parts of a 2.8% solution of potassium persulfate, and 25 parts of carbon bisulfide were then dispersed in the emulsion and the mixture polymerized in a pressure vessel for 20 hours at 55° C. The resulting latex-like dispersion was coagulated by adding a saturated brine solution and isopropyl alcohol. The coagulate, after washing three times with water and once with alcohol in a kneader, was dried by milling on a warm mill.

*Example 2.*—A sulphite stock paper was coated in a standard coating machine with 132° F. melting point petroleum wax at the rate of 12 lbs. per ream. The wax coating formed was 0.0028 inch thick.

When this coated paper was subjected to the desiccant method of determining moisture-vapor penetration as described in Example 1, the average value (five tests) was 12.3 g. $H_2O$ per square meter per 24 hours when exposed at 50% relative humidity at 25° C. for 144 hours.

When a blend of 8% of the same resinous copolymer as in Example 1 in 92% of the said 132° F. melting point petroleum wax was coated on the same sulphite stock paper in the same coating machine with the same weight of coating per ream and the same thickness of coating and the coated paper was subjected to the same moisture-vapor penetration test, i. e., at 50% relative humidity and 25° C. for 144 hours, the average value (five tests) for moisture-vapor penetration was 5.7 g. $H_2O$ per square meter per 24 hours.

Similar results are obtainable by substituting waxes such as beeswax, coccerin or montan wax for the petroleum wax, and by substituting styrene-butadiene, styrene-dimethyl butadiene, para methyl styrene-butadiene copolymers instead of the styrene-isoprene copolymers.

The foregoing description contains a limited number of embodiments of the present invention. It will be understood, however, that this invention is not limited to the specific details described since numerous variations are possible without departing from the scope of the present invention as defined in the claims set out below. This application is a continuation in part of our Application Serial No. 408,716 filed August 29, 1941 and now abandoned.

What we claim and desire to secure by Letters Patent is:

1. A composition of matter which comprises a mixture of 98 to 40% by weight of wax and 2 to 60% by weight of a hard, resinous, thermoplastic, emulsion-polymerization copolymer of 65 to 90 weight percent of styrene and from 35 to 5 weight percent of a conjugated diolefin of from 4 to 6 carbon atoms per molecule.

2. A composition of matter which comprises a mixture of 95 to 75% by weight of wax and 5 to 25% by weight of a hard, resinous, thermoplastic, emulsion-polymerization copolymer of 65 to 95% by weight of styrene and from 35 to 5 weight percent isoprene.

3. A composition of matter which comprises a mixture of 95 to 75% by weight of wax and 5 to 25% by weight of a hard, resinous, thermoplastic, emulsion-polymerization copolymer of 65 to 95% by weight of styrene and from 35 to 5 weight percent butadiene.

4. A composition of matter which comprises a mixture of 95 to 75% by weight of mineral wax and 5 to 25% by weight of a hard, resinous, thermoplastic copolymer of 65% by weight of styrene and 35% by weight of isoprene prepared by emulsion polymerization to at least 90% conversion and having a molecular weight of at least 400,000.

WILLIAM J. SPARKS.
ANTHONY H. GLEASON.
PER K. FROLICH.

REFERENCES CITED

The following references are of record in the file of this patent:

UNITED STATES PATENTS

| Number | Name | Date |
|---|---|---|
| 2,194,350 | Berg | Mar. 19, 1940 |
| 2,396,293 | Smith | Mar. 12, 1946 |
| 2,402,331 | Kvalnes | June 18, 1946 |